United States Patent [19]
Amanuma et al.

[11] Patent Number: 5,764,006
[45] Date of Patent: Jun. 9, 1998

[54] MOTOR DRIVING CIRCUIT AND METHOD FOR DRIVING TWO MOTORS

[75] Inventors: Tatsuo Amanuma, Saitama-ken; Toru Kosaka, Kanagawa-ken, both of Japan

[73] Assignee: Nikon Corporation, Tokyo, Japan

[21] Appl. No.: 539,440

[22] Filed: Oct. 5, 1995

[30] Foreign Application Priority Data

Feb. 1, 1995 [JP] Japan ......................... 7-036006

[51] Int. Cl.$^6$ ......................................... H02P 1/54
[52] U.S. Cl. ................. 318/103; 318/112; 396/406; 396/410
[58] Field of Search ............ 318/34–112; 396/387, 396/403–405, 406–410, 411, 413

[56] References Cited

U.S. PATENT DOCUMENTS

| | | | |
|---|---|---|---|
| 4,779,109 | 10/1988 | Kawamura et al. | 396/208 |
| 5,107,290 | 4/1992 | Ohsawa | 354/173.1 |
| 5,128,704 | 7/1992 | Hayashi et al. | 396/299 |
| 5,153,487 | 10/1992 | Hennig | 318/293 |
| 5,291,233 | 3/1994 | Hashimoto et al. | 396/60 |
| 5,335,029 | 8/1994 | Itoh et al. | 354/106 |

*Primary Examiner*—David S. Martin
*Attorney, Agent, or Firm*—Oliff & Berridge, P.L.C.

[57] ABSTRACT

A film driving circuit that is capable of normal driving and reverse driving to drive-control a first motor and a second motor each rotating in only one direction. The motor driving circuit is structured so the first motor driving and the second motor driving is controlled by four switching elements composing a bridge circuit. The first motor connects to the connecting points of two of the switching elements. The second motor connects to the connecting points of the other two of the four switching elements. A CPU controls the first motor and the second motor by controlling the on-off status of the four switching elements.

18 Claims, 3 Drawing Sheets

MOTOR DRIVING CIRCUIT AND METHOD FOR DRIVING TWO MOTORS

BACKGROUND OF THE INVENTION

1. Field of the Invention

The present invention relates to a motor driving circuit that improves drive-control of a built-in motor of a camera.

2. Background of Related Art

In a conventional camera, one or two motors are used to control film feeding. One motor can be used to control the winding motion and the rewinding motion of the film. Alternatively, a conventional camera can use two motors. A first motor exclusively performs the winding motion and a second motor exclusively performs the rewinding motion of the film.

Circuitry of a conventional camera where one motor executes film feeding control is shown in FIG. 3.

A battery 1 supplies voltage to the camera circuit. A constant-voltage circuit 2 makes the battery voltage supplied from the battery 1 constant. The constant-voltage circuit 2 further supplies voltage to a CPU 3 and a film feeding motor driving circuit 4. The CPU 3 controls a series of camera operations. The film feeding motor driving circuit 4 is composed of a logic unit 41 that outputs signals to drive a power unit 42 based on control signals 6 and 7 from the CPU 3. The power unit 42 (power transistors 43, 44, 45 and 46) drives a film feeding motor 5. The film feeding motor 5 executes winding and rewinding of film in the camera. The control signals 6 and 7 from the CPU 3 to the film feeding motor driving circuit 4 control the motor 5 driving. The driving status of the motor 5 for the control signals 6 and 7 is set forth as follows in Table 1.

TABLE 1

| Mode | Control Signal 6 | Control Signal 7 | Transistor 43 | Transistor 44 | Transistor 45 | Transistor 46 | Terminal A | Terminal B | State of Motor Drive |
|---|---|---|---|---|---|---|---|---|---|
| A | L | L | OFF | OFF | OFF | OFF | HiZ | HiZ | Stop |
| B | H | L | ON | OFF | OFF | ON | H | L | Normal Rotation (advancing film) |
| C | L | H | OFF | ON | ON | OFF | L | H | Reverse Rotation (rewinding film) |
| D | H | H | OFF | OFF | ON | ON | L | L | Braking |

In a conventional camera where one motor is used both to wind film and rewind film, a change in torque can be desirable to compensate for the difference between the load during winding and the load during rewinding. Further, a change in speed can be desirable during the film winding or the film rewinding. If these desirable changes are not performed by changing the gear ratio, two motors are required. The first motor is used exclusively for winding film and the second motor is used exclusively for rewinding film. However, using two motors also requires two motor driving circuits. Two motor driving circuits increase the camera cost and require more space in the camera for mounting.

SUMMARY OF THE INVENTION

The present invention solves at least the problems described above and avoids a cost increase because of an additional motor driving circuit by drive-controlling the two motors that rotate in only one direction to wind film and to rewind film with a single motor driving circuit. The motor driving circuit is capable of both normal driving and reverse driving.

The motor driving circuit according to the present invention may be structured so driving of the first motor and the second motor are both controlled by four switching elements composing a bridge circuit. The first and second motors rotate in only one direction. The first motor connects to the connecting points and the grounding points of two of the switching elements of the bridge circuit. The second motor connects to the connecting points and the grounding points of the other two of the switching elements of the bridge circuit. A CPU controls the two motors by controlling the on-off statuses of the four switching elements. The motor driving circuit according to the present invention avoids any cost increase from additional motor driving circuits by sharing one motor driving circuit that is capable of both normal driving and reverse driving to drive-control the two motors.

Other objects, advantages and salient features of the invention will become apparent from the detailed description taken in conjunction with the annexed drawings, which illustrate preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
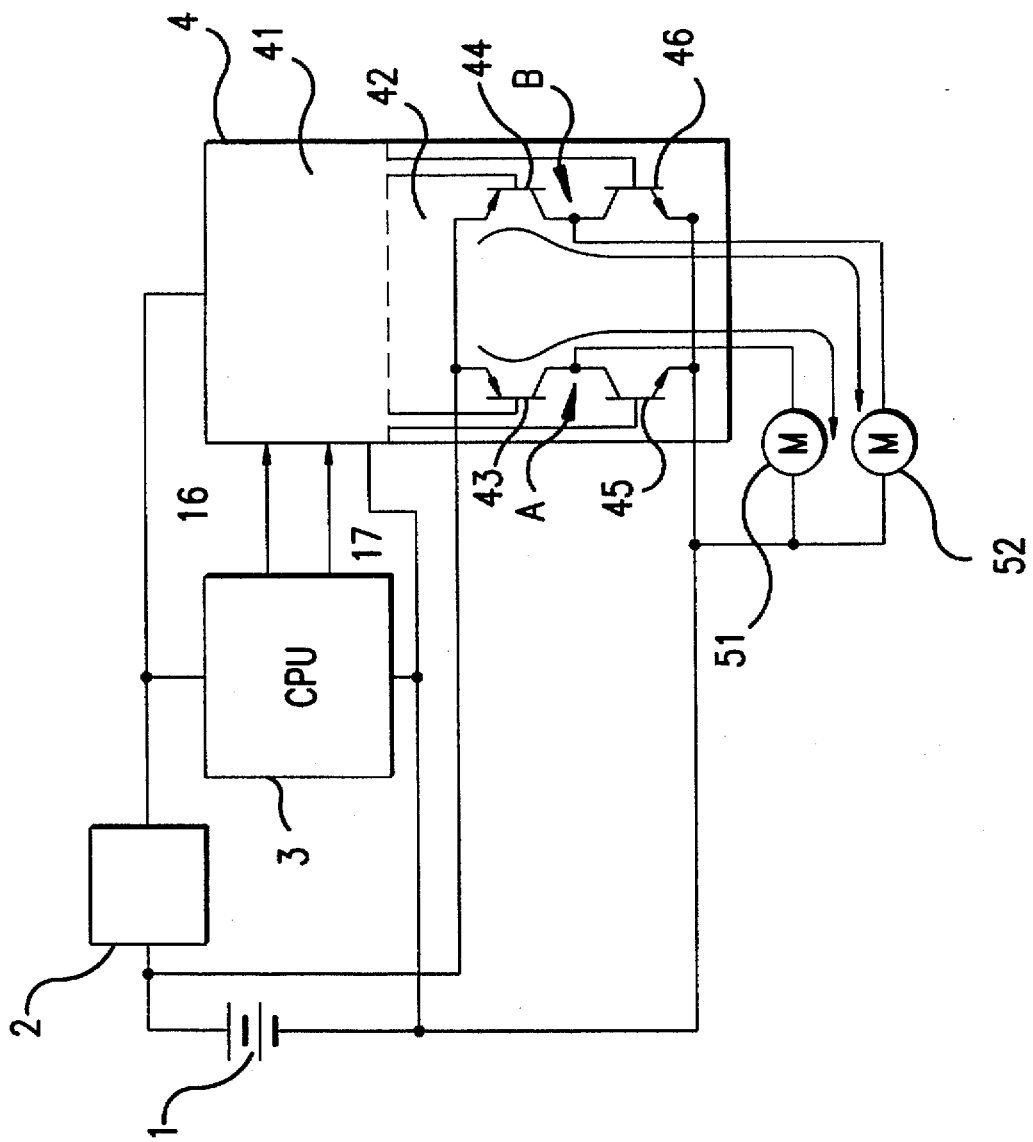
FIG. 1 is a block schematic diagram showing camera circuitry including a motor driving circuit according to one embodiment of the present invention.

Referring to FIG. 1, the camera circuitry for performing and controlling the performance of the motor driving according to a first preferred embodiment includes a central processing unit controller or CPU 3 and a film feeding motor drive circuit responsive to control signals produced by the CPU 3 for performing motor control. The CPU 3 can control additional camera operations (not shown).

It will be appreciated by those skilled in the art that the camera circuitry may be implemented as a single special purpose integrated circuit (e.g., ASIC) having a main or central processor section for overall, system-level control, and separate sections dedicated to performing various different specific computations, functions and other processes under control of the central processor section. The camera circuitry can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller CPU can also be implemented using a suitably programmed general purpose computer, e.g., a microprocessor, microcontroller or other processor device (CPU or MPU), either alone or in conjunction with one or more peripheral (e.g., integrated circuit) data and signal processing devices. As shown, a distributed processing architecture is preferred for maximum data/signal processing capability and speed.

As shown in FIG. 1, a battery 1 supplies voltage to the camera circuitry. A constant-voltage circuit 2 makes the battery voltage supplied from the battery 1 constant. The constant voltage circuit 2 further supplies voltage to the CPU 3 and the film feeding motor driving circuit 4. The CPU 3 outputs control signals 16 and 17 to the film feeding motor driving circuit 4 and can also control additional camera operations. The film feeding motor driving circuit 4 is composed of a logic unit 41 that outputs signals to drive a power unit 42 based on the control signals 16 and 17. The power unit 42 (power transistors 43, 44, 45 and 46) drives a motor 51 that exclusively winds film and drives a motor 52 that exclusively rewinds film.

The motor 51 drives only in the direction of film winding. The motor 52 drives only in the direction of film rewinding. The control signals 16 and 17 from the CPU 3 to the film feeding motor driving circuit 4 actuate the motor 51 driving and the motor 52 driving. The driving status of the motor 51 and the motor 52 for the control signals 16 and 17 are set forth as follows in Table 2. The motor 51 is driven to wind the film and the motor 52 is driven to rewind the film. Therefore, the two motors have different operation timings for their respective driving sequences.

TABLE 2

| Mode | Control Signal | | Transistor | | | | Terminal | | State of Motor Drive |
|------|----|----|-----|-----|-----|-----|-----|-----|------------------------|
|      | 16 | 17 | 43  | 44  | 45  | 46  | A   | B   |                        |
| A    | L  | L  | OFF | OFF | OFF | OFF | HiZ | HiZ | Stop                   |
| B    | H  | L  | ON  | OFF | OFF | ON  | H   | L   | Motor 51 driving (advancing film) |
| C    | L  | H  | OFF | ON  | ON  | OFF | L   | H   | Motor 52 driving (rewinding film) |
| D    | H  | H  | OFF | OFF | ON  | ON  | L   | L   | Motor 51, 52 driving (braking) |

As shown in Table 2, winding of the film is performed by driving the motor 51 when the power transistor 43 is turned on (mode B). In this case, the power transistor 46 is turned on, which causes the motor 52 to be in short brake status. Similarly, rewinding of the film is performed by driving the motor 52 when the power transistor 44 is turned on (mode C). In this case, the power transistor 45 is turned on, which causes the motor 51 to be in short brake status. As shown, the driving sequences of the motor 51 and the motor 52 have different operation timings. In the first preferred embodiment, the transistors 45 and 46 of the power unit 42 that turn on during brake control in the film feeding motor driving circuit 4 are NPN transistors.

Figure 2:
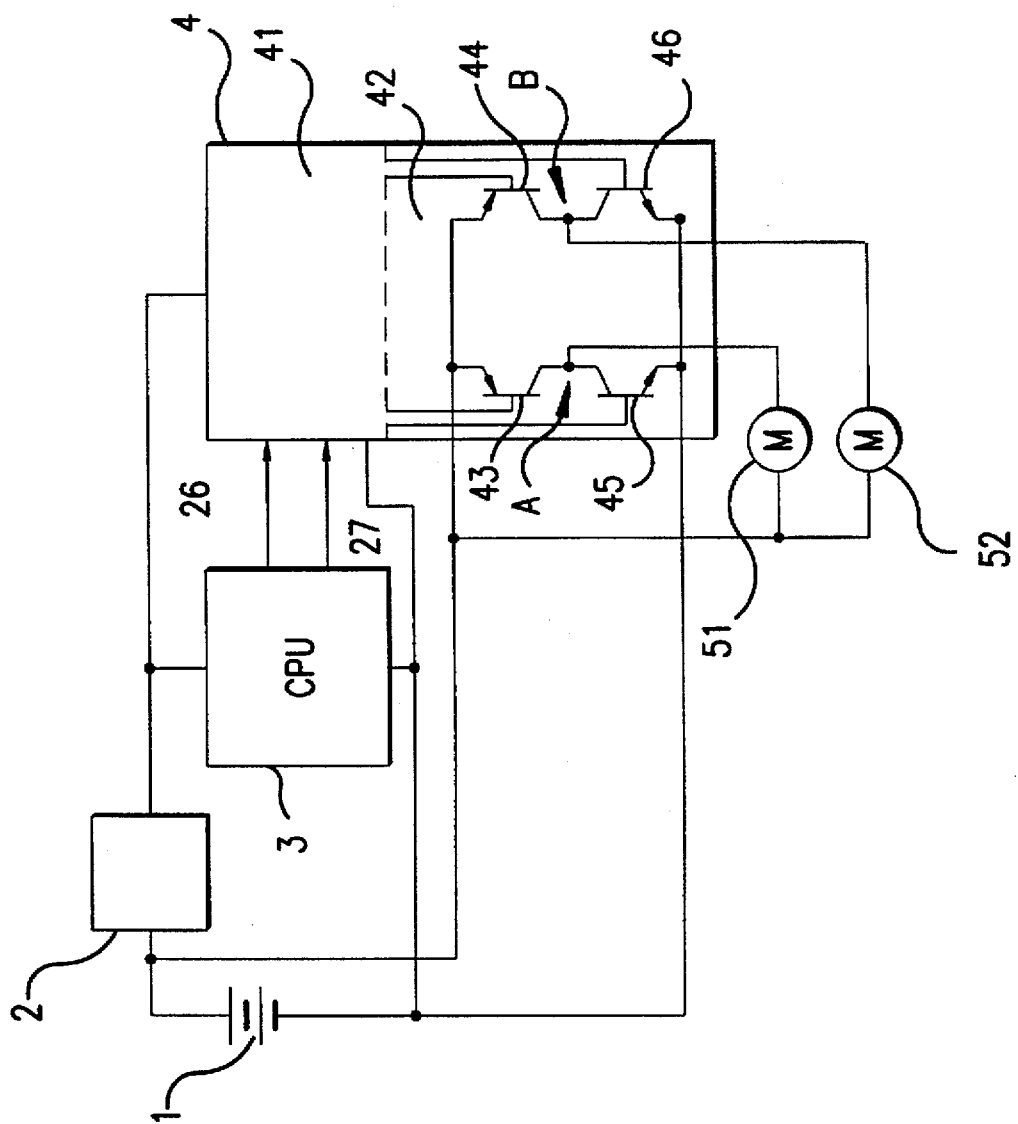
FIG. 2 is a block schematic diagram showing camera circuitry including a motor driving circuit according to another embodiment of the present invention.
Figure 3:
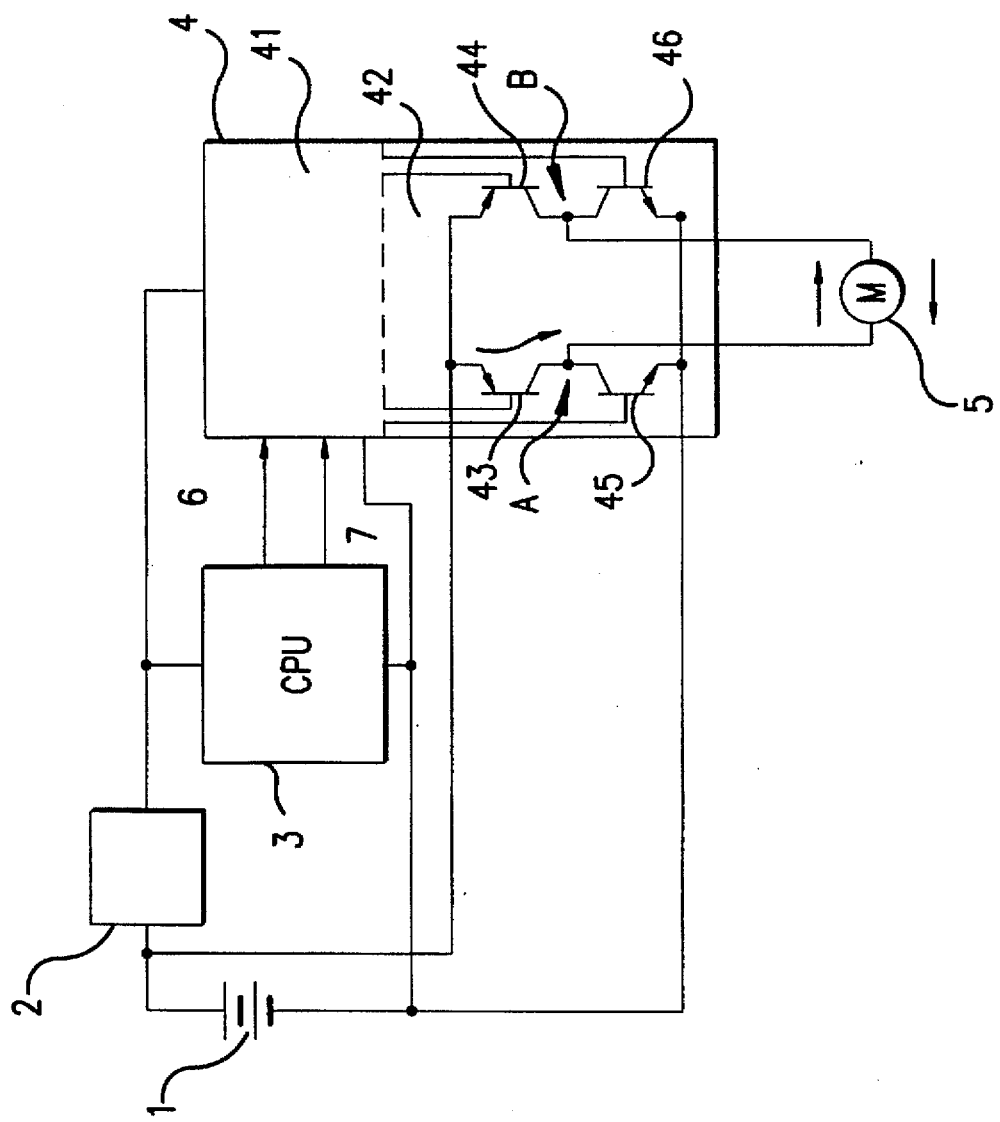
FIG. 3 is a block schematic diagram showing a conventional motor driving circuit.

FIG. 2 shows the camera circuitry for a second preferred embodiment according to the present invention. The film feeding motor driving circuit 4 is composed of the logic unit 41 that outputs signals to drive the power unit 42 based on control signals 26 and 27 from the CPU 3. The control signals 26 and 27 from the CPU 3 to the film feeding motor driving circuit 4 control execution of the motor 51 and the motor 52 driving. The driving status of the motor 51 and the motor 52 for the control signals 26 and 27 are set forth as follows in Table 3.

TABLE 3

| Mode | Control Signal | | Transistor | | | | Terminal | | State of Motor Drive |
|------|----|----|-----|-----|-----|-----|-----|-----|------------------------|
|      | 26 | 27 | 43  | 44  | 45  | 46  | A   | B   |                        |
| A    | L  | L  | OFF | OFF | OFF | OFF | HiZ | HiZ | Stop                   |
| B    | H  | L  | ON  | OFF | OFF | ON  | H   | L   | Motor 51 driving (advancing film) |
| C    | L  | H  | OFF | ON  | ON  | OFF | L   | H   | Motor 52 driving (rewinding film) |
| D    | H  | H  | ON  | ON  | OFF | OFF | H   | H   | Motor 51, 52 braking   |

As shown in Table 3, winding of the film is performed by driving the motor 51 when the power transistor 43 is turned on (mode B). In this case, the power transistor 46 is turned on, which causes the motor 52 to be in short brake status. Similarly, rewinding of the film is performed by driving the motor 52 when the power transistor 44 is turned on (mode C). In this case, the power transistor 45 is turned on, which causes the motor 51 to be in short brake status. As shown, the motor 51 and the motor 52 have different operation timings for their respective driving sequences. In the second preferred embodiment, the transistors 43 and 44 of the power unit 42 that turn on during brake control in the film feeding motor driving circuit 4 are PNP transistors.

In the preferred embodiments, motor drive-control of both one directional motors is independently performed using one motor driving circuit. One motor is used exclusively for winding film and the other motor is used exclusively for rewinding film. Thus, a motor with optimum characteristics for winding film and a motor with optimum characteristics for rewinding film can be individually selected. A cost increase is avoided in a second motor driving circuit and the number of motor drive-control signal lines from the CPU to the motor driving circuit is reduced to two. Further, the motor driving circuit of the present invention is capable of both normal driving and reverse driving. Therefore, an increase in camera cost from an additional motor driving circuits is avoided.

While this invention has been described in conjunction with the specific embodiments outlined above, many alternatives, modifications and variations will be apparent to those skilled in the art. Accordingly, the preferred embodiments as set forth above are intended to be illustrative, not limiting. Various changes may be made without departing from the spirit and scope of the invention as defined in the following claims.

What is claimed is:

1. A camera motor driving circuit comprising:
    a first motor that rotates only in one direction;
    a second motor that rotates only in one direction; and
    a single bridge circuit that drives the first motor and the second motor, the bridge circuit consisting of four switching elements, the first motor being connected to a connecting point of two of the four switching elements, the second motor being connected to a connecting point of a remaining two of the four switching elements, wherein ON-OFF status of the four switching elements controls driving of the first motor and the second motor.

2. The motor driving circuit according to claim 1, wherein an operation timing required for the first motor and an operation timing required for the second motor are different from each other.

3. The motor driving circuit according to claim 1, wherein the first motor is a film winding motor and the second motor is a film rewinding motor.

4. The motor driving circuit according to claim 1, further comprising:

control signals for respectively controlling the ON-OFF status of the four switching elements; and a control device that generates and outputs the control signals.

5. The motor driving control circuit according to claim 4, wherein the control signals include four control signals for controlling the four switching elements, the first motor and the second motor.

6. The motor driving circuit according to claim 1, wherein the switching elements are transistors.

7. A motor drive circuit for a camera comprising:

two drive control signal lines that transmit at least two drive control signals;

a first motor that advances film in a first direction; and a second motor that advances film in a second direction different from the first direction, wherein drive control of the first motor and the second motor is performed using the at least two drive control signals transmitted over the two drive control signal lines to a bridge circuit consisting of four switching elements to drive the first motor in the first mode to advance the film, to drive the second motor in the second mode to advance the film and to drive the first motor and the second motor to brake the film in a third mode.

8. The drive circuit of claim 7, further comprising at least four switching elements that receive the drive control signals and control the drive control of the first motor and the second motor based on a status of the switching elements.

9. The drive circuit of claim 8, wherein the first motor and the second motor are driven in a halt state in a fourth mode.

10. A camera motor driving circuit comprising:

first driving means for advancing film in a first direction;

second driving means for advancing film in a second direction different from the first direction; and bridge circuit means consisting of first, second, third and fourth switching devices for controlling driving of the first driving means and the second driving means, the first driving means being connected to a connecting point between the first and third switching devices, the second driving means being connected to a connecting point between the second and fourth switching devices, wherein collectors of the first and second switching devices are connected.

11. The motor driving circuit of claim 10, wherein a status of the switching elements controls the first driving means and the second driving means.

12. The motor driving circuit according to claim 10, wherein the first driving means includes a film winding motor and the second driving means includes a film rewinding motor.

13. The motor driving circuit according to claim 12, wherein an operation timing required for the film winding motor is different from an operation timing required for the film rewinding motor.

14. The motor driving circuit according to claim 10, further comprising:

two control lines that transmit control signals for controlling an ON-OFF status of the switching devices; and control means for outputting the control signals on the control lines.

15. The driving control circuit according to claim 10, wherein the switching devices are transistors.

16. A method of advancing and rewinding film in a camera having two drive motors, two control lines for transmitting control signals and one drive control circuit for the two drive motors, the method comprising the steps of:

transmitting first select control signals over the two control lines to actuate a first subset of a set of switching elements, consisting of two switching devices the actuated first subset of switching elements causing a first motor to advance the film; and transmitting second select control signals over the two control lines to actuate a second subset of the set of switching elements, consisting of two switching devices the actuated second subset of switching elements causing a second motor to rewind the film, wherein at least two switching elements of the set of switching elements are connected to both the first motor and the second motor.

17. The method according to claim 16, wherein the control signals transmitted over the control lines control an ON-OFF status of the switching elements, the ON-OFF status of the switching elements controlling operation of the first motor and the second motor.

18. The method according to claim 17, wherein the operation of the first motor and the second motor is at least one of a short brake state, a driving state and a halt state.

* * * * *